United States Patent
Raboin

(10) Patent No.: US 6,595,230 B2
(45) Date of Patent: Jul. 22, 2003

(54) NON-REFILLABLE VALVE FOR A GAS CYLINDER

(75) Inventor: Ron Raboin, DePere, WI (US)

(73) Assignee: Western Industries, Inc., Chilton, WI (US)

( * ) Notice: Subject to any disclaimer, the term of this patent is extended or adjusted under 35 U.S.C. 154(b) by 0 days.

(21) Appl. No.: 10/197,671

(22) Filed: Jul. 17, 2002

(65) Prior Publication Data

US 2003/0029508 A1 Feb. 13, 2003

Related U.S. Application Data

(60) Provisional application No. 60/310,934, filed on Aug. 8, 2001.

(51) Int. Cl.[7] ............................................. F16K 15/04
(52) U.S. Cl. .................... 137/1; 137/614.05; 137/460; 222/147
(58) Field of Search ............................ 137/614.05, 460, 137/843, 1; 222/147

(56) References Cited

U.S. PATENT DOCUMENTS

| | | | |
|---|---|---|---|
| 1,164,014 A | 12/1915 | Phillips | |
| 3,498,315 A | * 3/1970 | Graves et al. | .......... 137/843 X |
| 3,704,813 A | 12/1972 | Devol | |
| 3,947,942 A | 4/1976 | Blocker | |
| 4,113,220 A | 9/1978 | Godwin et al. | |
| 4,119,295 A | 10/1978 | Blocker | |
| 4,543,980 A | 10/1985 | van der Sanden | |
| 4,573,611 A | * 3/1986 | O'Connor | ................ 251/111 X |
| 4,838,309 A | 6/1989 | Goodwin | |
| 4,898,210 A | 2/1990 | Nitta | |
| 5,048,565 A | 9/1991 | Oi | |
| 5,127,436 A | 7/1992 | Campion et al. | |
| 5,144,973 A | 9/1992 | Green et al. | |
| 5,419,361 A | 5/1995 | Caudle et al. | |
| 5,467,798 A | * 11/1995 | Baker et al. | .............. 137/614.2 |
| 5,566,713 A | 10/1996 | Lhomer et al. | |
| 5,755,424 A | 5/1998 | Ryd | |
| 5,941,268 A | 8/1999 | Ross, Jr. | |
| 5,996,625 A | 12/1999 | Collado et al. | |
| 6,102,367 A | 8/2000 | Schmitz et al. | |
| 6,227,223 B1 | 5/2001 | Crochet et al. | |
| 6,227,419 B1 | 5/2001 | Raboin | |

* cited by examiner

*Primary Examiner*—Kevin Lee
(74) *Attorney, Agent, or Firm*—Foley & Lardner

(57) ABSTRACT

A non-refillable valve in a compressed gas cylinder to prevent the refilling of the cylinder after depletion of compressed gas initially in the cylinder. The non-refillable valve comprises a valve housing defining a valve chamber, with the valve chamber having a proximal end and a distal end. A valve core including a valve pin is coupled to the valve housing in the valve chamber. A detent formed in the valve housing extends into the valve chamber. A check ball is positioned in the valve chamber with the check ball movable from a first position past the detent to a second position, wherein the check ball is disposed against the ball seat at the distal end of the valve chamber forming a seal that prevents refilling of the cylinder.

30 Claims, 1 Drawing Sheet

NON-REFILLABLE VALVE FOR A GAS CYLINDER

CROSS REFERENCE TO RELATED PATENT APPLICATIONS

This application claims the benefit of U.S. Provisional Application No. 60/310,934, filed Aug. 8, 2001.

BACKGROUND OF THE INVENTION

The present invention relates to a valve mechanism for compressed gas cylinders and, more particularly, to a non-refillable valve for a compressed gas cylinder.

Compressed gas cylinders such as the type used on camping stoves, camping lanterns or torches used in the plumbing industry typically utilize a compressed gas in the cylinder such as propane, propylene, butane or methyl acetylene propadiene stabilized (MAPP®). The gas is charged into the cylinder under pressure which maintains the gas in a liquid state.

Existing valves for compressed gas cylinders typically utilize a valve assembly that has a spring biased pin which seals the gas in the cylinder. During a filling operation, the filling appliance that is attached to the gas cylinder pushes against and depresses the pin to open the valve to allow the fluid to enter the cylinder and squirt a measured amount of the fluid into the cylinder. When the appliance is retracted, the fill valve spring closes the valve and retains the gas in the cylinder. During the use of the cylinder, the separate application appliance that typically has an external valve assembly again depresses the interior valve stem which opens the cylinder to allow the fluid to expel into the externally valved appliance such as a camping stove or a torch, etc.

Recent legislation, particularly in the European community, is requiring that certain types of compressed gas cylinders be permitted to fill only once, i.e., be non-refillable.

Thus there is a need for a compressed gas cylinder valve that will allow the initial filling of the cylinder with the fluid such as compressed gas in a liquid state, allow such fluid to be extracted from the cylinder in the ordinary use of such compressed gas cylinder and then prevent the cylinder from being refilled with the fluid. There is a further need for a container, for fluids or solids, having a non-refillable valve.

SUMMARY OF THE INVENTION

The present invention provides a non-refillable valve in a compressed gas cylinder to prevent the refilling of the cylinder after depletion of compressed gas initially in the cylinder. The non-refillable valve comprises a valve housing defining a valve chamber, with the valve chamber having a proximal end and a distal end. A valve core including a valve pin is coupled to the valve housing in the valve chamber. A detent formed in the valve housing extends into the valve chamber. A check ball is positioned in the valve chamber with the check ball movable from a first position past the detent to a second position, wherein the check ball is disposed against the ball seat at the distal end of the valve chamber forming a seal that prevents refilling of the cylinder. Another embodiment of the non-refillable valve includes a detent that is arcuate and segmented. The detent can also be two or more dimples formed in the valve housing and extending into the valve chamber.

There is also provided a method for preventing the refilling of a compressed gas cylinder with the cylinder having a valve housing defining a valve chamber and a valve core with the valve pin positioned in the valve chamber. The method comprises the steps of forming a detent in the valve housing, with the detent extending into the valve chamber. Placing a check ball in the valve chamber between the valve pin and the detent. Then charging the cylinder with compressed gas, with the check ball in a first position which allows the compressed gas to flow past the check ball into the cylinder. Then extending the valve pin to push the check ball past the detent to a second position in the valve chamber, wherein an attempt to refill the cylinder will dispose the check ball against the ball seat forming a seal that prevents compressed gas from entering the cylinder.

There is also provided a compressed gas cylinder. The gas cylinder comprises a vessel having a wall and defining a cylinder opening in the wall. A relief valve is mounted in the wall a spaced distance from the cylinder opening. A valve housing defining a valve chamber is mounted in the cylinder opening. The valve chamber has a proximal end and a distal end. A valve core including a valve pin is coupled to the valve housing in the valve chamber. A detent is formed in the valve housing and extends into the valve chamber. A check ball is positioned in the valve chamber with the check ball configured to move from a first position past the detent to a second position. Upon moving from the first position to the second position, the check ball is disposed against a ball seat at the distal end of the valve chamber forming a seal that prevents refilling of the compressed gas cylinder.

There is additionally, provided a non-refillable valve for a compressed gas cylinder to prevent the refilling of the cylinder after depletion of compressed gas initially in the cylinder. The non-refillable valve comprises a means for containing defining a void, with the void having a proximal end and a distal end. A means for metering including a means for actuating is coupled to the means for containing in the void. A means for retarding is formed in the means for containing and extending into the void. A means for sealing is positioned in the void with the means for sealing configured to move from a first position past the means for retarding to a second position. When the means for sealing moves from the first position to the second position, the means for sealing is disposed against a means for seating at the distal end of the void forming a seal that prevents refilling of the cylinder.

There is also provided a non-refillable valve for container to prevent the refilling of the container after depletion of material initially in the container. The non-refillable valve comprises a valve housing defining a valve chamber, with the valve chamber having a proximal end distal end. A valve core including a valve pin is coupled to the valve housing in the valve chamber. A detent is formed in the valve housing and extends into the valve chamber. A check ball positioned in the valve chamber with the check ball configured to move from a first position past the detent to a second position. When the check ball moves from the first position to the second position it is disposed against the ball seat at the distal end of the valve chamber forming the seal that prevents refilling of the container.

There is additionally provided a container comprising a vessel having a wall and defining a container opening in the wall. The valve housing defining a valve chamber is mounted in the container opening with the valve chamber having a proximal end and a distal end. A valve core is coupled to the valve housing in the valve chamber, with the valve core including a valve pin. A detent is formed in the valve housing and extends into the valve chamber. A check ball is positioned in the valve chamber. The check ball is configured to move from a first position past the detent to a second position. When the check ball is in the second position, it is disposed against the ball seat at the distal end of the valve chamber forming a seal that prevents refilling of the container.

DETAILED DESCRIPTION OF THE PREFERRED EMBODIMENTS

Figure 1:
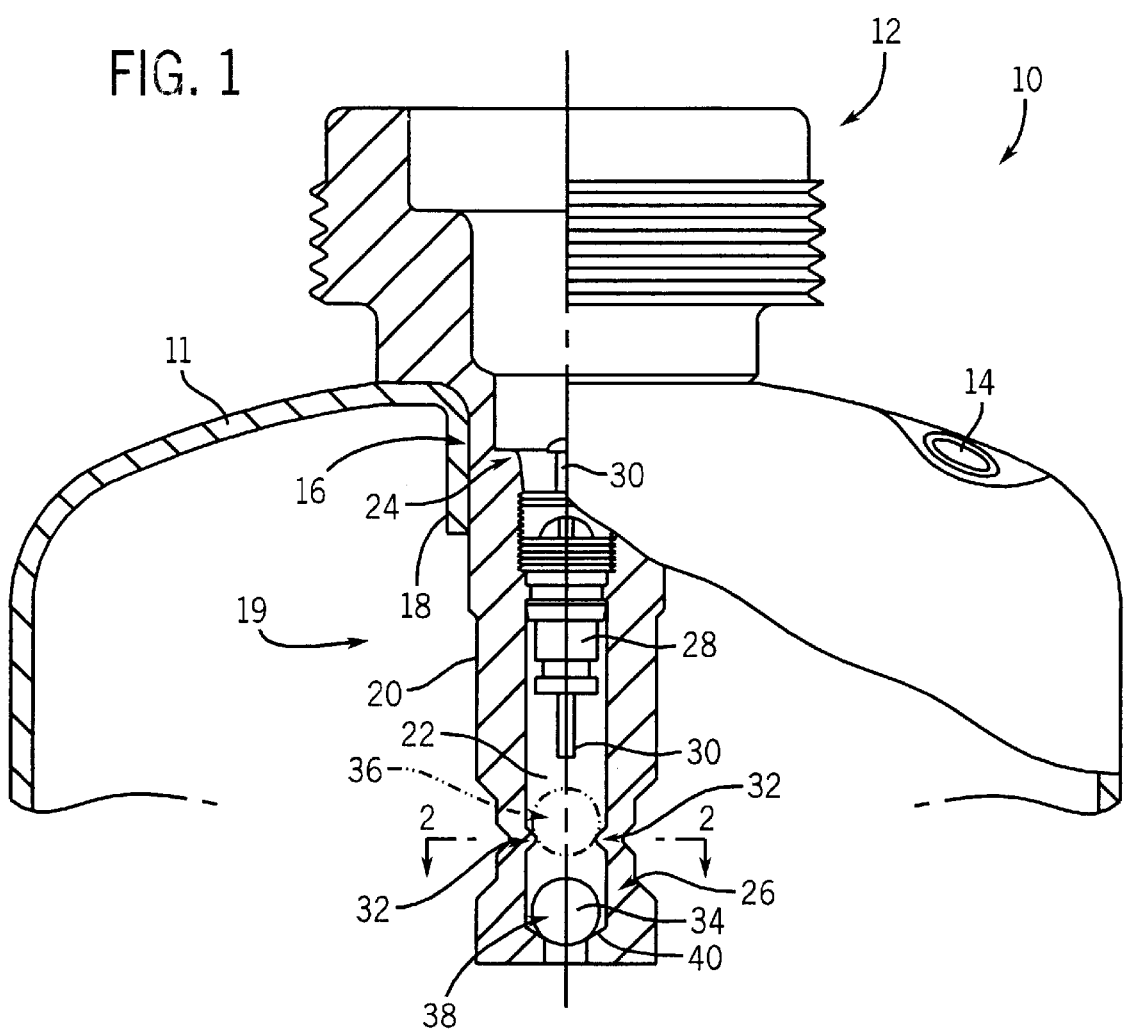
FIG. 1 is a partial cut away view of a compressed gas cylinder including an exemplary embodiment of a non-refillable valve assembly.
Figure 2:
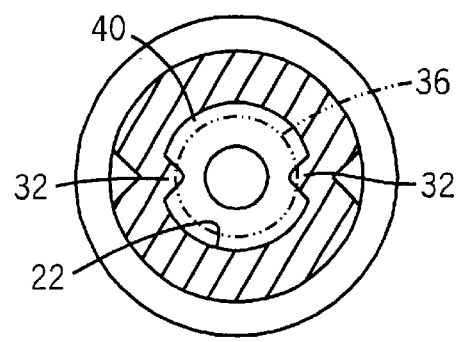
FIG. 2 is a cross-sectional view of the valve assembly illustrated in FIG. 1, along the line 2—2.
Figure 3:
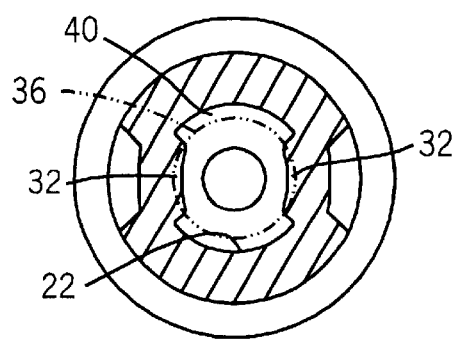
FIG. 3 is a cross-sectional view of another exemplary embodiment of the detent in the valve housing of a non-refillable valve assembly.

Referring to FIG. 1, there is illustrated a partial sectional view of a compressed gas cylinder 10. The cylinder 10 is also referred to as a container 10 having a vessel 11 wall. The gas cylinder 10 has a formed vessel 11 which has a hole pierced into the vessel 11 wall forming a cylinder opening 16. In the process of piercing the cylinder vessel 11, a shoulder 18 is formed in the cylinder vessel 11. The shoulder is typically annular and is configured to receive a valve housing 20. One end of the valve housing 20, typically extends outside of the cylinder vessel 11 includes an external appliance connection 12. The external appliance connection 12 typically is a threaded portion of the valve housing 20. During manufacturing of the cylinder 10, the valve housing is fitted into the cylinder vessel 11 and attached to the vessel by a convenient and conventional method such as by welding or copper brazing. The cylinder 10 is typically provided with a relief valve 14.

A valve housing 20 defines a valve chamber 22 which has a proximal end 24 and a distal end 26. A non-refillable valve 19 is a combination of a valve core 28, a check ball 34 and a detent 32 as will be described below.

A valve core 38 includes a valve pin 30 which extends through the valve core 28. The valve core 28 is positioned in the valve chamber 22 and coupled to the valve housing 20, typically by screwing the valve core 28 into a threaded portion of the valve housing 20.

A detent 32 is formed in the valve housing 20 with the detent 32 extending into the valve chamber 22. The detent 32 can be a pair of dimples, typically diametrically opposed within the valve chamber 22. It is also contemplated that the detent 32 can be an arcuate, segmented protrusion into the valve chamber 22. A plurality of detents can also be provided.

A check ball 34 is positioned in the valve chamber 22, with the check ball 34 movable from a first position 36 past the detent 32 to a second position 38 within the valve chamber 22. The check ball 34 is configured to be retained in the first position 36 by the detent 32 during the initial filling operation of the compressed gas into the compressed gas cylinder 10. The diameter of the check ball 34 and the diameter of the valve chamber 22 are such that as the check ball 34 rests against the detent 32 there is still sufficient room for the compressed gas fluid to flow past the check ball 34 into the cylinder 10. A fluid seal is not formed by the check ball 34 against the detent 32 in the first position 36.

During the filling operation, the valve pin 30 extends approximately 30% of its maximum stroke which is sufficient to open the valve core 28 and allow the compressed gas fluid to enter the cylinder 10. Such extension of the valve pin 30 does not push against or engage the check ball 34 which is in the first position 36 (See FIG. 1). An alternative filling operation may require the valve pin 30 to contact the check ball 34, with the check ball 34 resisting further extension of the valve pin 30 and remaining in the first position 36. When the filling appliance (not shown) is removed from the cylinder 10 upon completion of the filling operation, the valve pin 30, which is typically spring biased, closes the valve core 28 and prevents the compressed gas contained in the cylinder 10 from escaping.

At such time as an application appliance is mounted on the cylinder 10 at the external appliance connection 12, the valve pin 30 is depressed to its maximum stroke. Such movement causes the pin 30 to push the check ball 34 past the detent 32 and move the check ball 34 to a second position 38 at the distal end 26 of the valve chamber 22. (See FIG. 1) The application appliance maintains the valve pin 30 in an extended position which opens the valve core 28 and allows the compressed gas contained in the cylinder 10 to move through the valve chamber 22. The pressure of the compressed gas, typically 140 psi, moves the check ball 34 from the second position 38 to against the underside of the detent 32. As discussed above, because of the diameter of the check ball 34 and the diameter of the valve chamber 22, the compressed gas flows around the check ball 34 and out through the valve core 28 to the application appliance which typically has an external valving mechanism.

During use of the cylinder 10, the check ball 34 will move from the second position 38 to the underside of the detent 32 as the compressed gas is depleted in the cylinder 10. At such time as an operator attempts to refill the cylinder 10, the pressure of incoming gas forces the check ball 34 against the ball seat 40 forming a seal and preventing the incoming gas from flowing into the cylinder.

The check ball 34 should be composed of a material that will not adversely react with the type of material, such as compressed gas, used in the cylinder 10 but should be of sufficient strength and resilience to form the seal for example, a fluid seal, at the ball seat 40 during a refill attempt. The check ball 34 can be composed of a material, such as an elastomeric material, for example such as acetal, rubber, nylon, polyethylene, and similar materials suitable for a given application. Further, the check ball 34 should be hard enough to resist the force of refilling the container 10 and resist marring the check ball 34 which would prevent an adequate seat at the ball seat 40.

The check ball 34 should have a balance between a hardness characteristic and a resilience characteristic. That is, the check ball 34 should be resilient enough to seal against the ball seat 40 and prevent refilling of the cylinder 10 but yet hard enough to pass the detent 32 without chipping or permanently deforming such that a seal cannot be established at the ball seat 40 or the check ball 34 is displaced to the second position 38 due to initial filling process. The check ball 34 could have a hardness durometer reading of between 60–80, with a preferred 70 durometer reading. An example of a check ball 34 with such desired characteristics is a rubber check ball 34 composed of an epichlorohydrin elastomer, also referred to as a high-strength hydrin elastomer.

There is also provided a method for preventing the refilling of a compressed gas cylinder 10 with the cylinder 10 having a valve housing 20 defining a valve chamber 22 and a valve core 28 with a valve pin 30 positioned in the valve chamber 22. The method comprises the step of forming a detent 32 in the valve housing 20, with the detent 32 extending into the valve chamber 22. Then placing a check ball 34 in the valve chamber 22 between the valve pin 30 and the detent 32.

It is contemplated that during manufacture of the refillable valve 19, the detent 32 will be formed in the valve housing 20, then place the check ball 34 into the valve chamber 22 at the proximal end 24 of the valve chamber 22, then screwing the valve core 28 into a threaded portion of the valve chamber 22 near the proximal end 24 of the valve chamber 22 to complete the assembly of the non-refillable valve 19. The non-refillable valve 19 will then be placed in the cylinder opening 16 that is formed in the cylinder vessel 11 of the gas cylinder 10. The external appliance connection 12 will extend outside of the vessel 11 as shown in FIG. 1.

The method includes the charging of the cylinder 10 with compressed gas with the check ball 34 in a first position 36, as described above which allows the compressed gas to flow past the check ball 34 into the cylinder 10. Attaching an application appliance to the external appliance connection 12 of the non-refillable valve 19 extends the valve pin 30 to push the check ball 34 past the detent 32 to a second position 38 in the valve chamber 32. With the check ball 34 in the second position 38, an attempt to refill the cylinder 10 will dispose the check ball 34 against the ball seat 40 forming a fluid seal that prevents compressed gas from entering the cylinder 10. Another embodiment of the method includes the step of selecting the check ball from an elastomeric material that is suitable for the material being contained in the container 10.

Thus, there has been provided a non-refillable valve for a compressed gas cylinder. The embodiments illustrated in the figure and described above are presently preferred. It should be understood that these embodiments are offered by way of example only. The invention is not intended to be limited to any particular embodiment but it is intended to extend to various modifications that nevertheless fall within the scope of the appended claims. For example, the check ball can have diametrically opposed truncated cones. It is also contemplated that a plurality of detents can be formed in the valve housing. It is further contemplated that the valve housing can be formed from an engineered plastic or reinforced resin or metal suitable for exposure to the type of gas contained in the cylinder and the type of pressures being exerted on the several components. It is also contemplated that the check ball can be moved from the first position to the second position during the manufacturing process of the cylinder after the compressed gas fluid is initially charged into the cylinder. It is further contemplated that the non-refillable valve can be used with solid material in addition to a gas or a liquid, such as fine-grained sand or compounds. Other modifications will be evident to those with ordinary skill in the art.

What is claimed is:

1. A non-refillable valve for a compressed gas cylinder to prevent the refilling of the cylinder after depletion of compressed gas initially in the cylinder, the non-refillable valve comprising:
    a valve housing defining a valve chamber, with the valve chamber having a proximal end and a distal end;
    a valve core including a valve pin coupled to the valve housing in the valve chamber;
    a detent formed in the valve housing and extending into the valve chamber; and
    a check ball positioned in the valve chamber with the check ball configured to move from a first position past the detent to a second position,
    wherein the check ball is disposed against a ball seat at the distal end of the valve chamber forming a seal that prevents refilling of the cylinder.

2. The non-refillable valve of claim 1, wherein the detent is arcuate and segmented.

3. The non-refillable valve of claim 1, wherein the detent is configured as at least two dimples formed in the valve housing and extending into the valve chamber.

4. The non-refillable valve of claim 1, wherein, the check ball is composed of an elastomeric material.

5. The non-refillable valve of claim 1, wherein, the check ball has a measure of hardness within a 60–80 durometer reading range.

6. A method for preventing the refilling of a compressed gas cylinder with the cylinder having a valve housing defining a valve chamber having a valve seat and a valve core with a valve pin positioned in the valve chamber, the method comprises the steps of:
    forming a detent in the valve housing, with the detent extending into the valve chamber;
    placing a check ball in the valve chamber between the valve pin and the detent;
    charging the cylinder with compressed gas, with the check ball in a first position which allows the compressed gas to flow past the check ball into the cylinder;
    extending the valve pin to push the check ball past the detent to a second position in the valve chamber, wherein an attempt to refill the cylinder will dispose the check ball against the ball seat; and
    forming a seal that prevents compressed gas from entering the cylinder.

7. The method of claim 6, including the step of selecting the check ball from an elastomeric material.

8. The method of claim 6, wherein, the check ball has a measure of hardness within a 60–80 durometer reading range.

9. The method of claim 6, wherein the detent is arcuate and segmented.

10. The method of claim 6, wherein the detent is configured as at least two dimples formed in the valve housing and extending into the valve chamber.

11. A compressed gas cylinder comprising:
    a vessel having a wall and defining a cylinder opening in the wall;
    a relief valve mounted in the wall a spaced distance from the cylinder opening;
    a valve housing defining a valve chamber mounted in the cylinder opening, with the valve chamber having a proximal end and a distal end;
    a valve core including a valve pin coupled to the valve housing in the valve chamber;
    a detent formed in the valve-housing and extending into the valve chamber; and
    a check ball positioned in the valve chamber with the check ball configured to move from a first position past the detent to a second position,
    wherein the check ball is disposed against a ball seat at the distal end of the valve chamber forming a seal that prevents refilling of the compressed gas cylinder.

12. The compressed gas cylinder of claim 11, wherein the detent that is arcuate and segmented.

13. The compressed gas cylinder of claim 11, wherein the detent is configured as at least two dimples formed in the valve housing and extending into the valve chamber.

14. The compressed gas cylinder of claim 11, wherein, the check ball is composed of an elastomeric material.

15. The compressed gas cylinder of claim 11, wherein, the check ball has a measure of hardness within a 60–80 durometer reading range.

16. A non-refillable valve for a compressed gas cylinder to prevent the refilling of the cylinder after depletion of compressed gas initially in the cylinder, the non-refillable valve comprising:

a means for containing defining a void, with the void having a proximal end and a distal end;

a means for metering including a means for actuating coupled to the means for containing in the void;

a means for retarding formed in the means for containing and extending into the void; and a means for sealing positioned in the void with the means for sealing configured to move from a first position past the means for retarding to a second position, wherein the means for sealing is disposed against a means for seating at the distal end of the void forming a seal that prevents refilling of the cylinder.

17. The non-refillable valve of claim 16, wherein the means for retarding is arcuate and segmented.

18. The non-refillable valve of claim 16, wherein the means for retarding is configured as at least two dimples formed in the means for containing and extending into the void.

19. The non-refillable valve of claim 16, wherein, the means for sealing is composed of an elastomeric material.

20. The non-refillable valve of claim 16, wherein, the means for sealing has a measure of hardness within a 60–80 durometer reading range.

21. A non-refillable valve for a container to prevent the refilling of the container after depletion of material initially in the container, the non-refillable valve comprising:

a valve housing defining a valve chamber, with the valve chamber having a proximal end and a distal end;

a valve core including a valve pin coupled to the valve housing in the valve chamber;

a detent formed in the valve housing and extending into the valve chamber; and a check ball positioned in the valve chamber with the check ball configured to move from a first position past the detent to a second position, wherein the check ball is disposed against a ball seat at the distal end of the valve chamber forming a seal that prevents refilling of the container.

22. The non-refillable valve of claim 21, wherein the detent is arcuate and segmented.

23. The non-refillable valve of claim 21, wherein the detent is configured as at least two dimples formed in the valve housing and extending into the valve chamber.

24. The non-refillable valve of claim 21, wherein, the check ball is composed of an elastomeric material.

25. The non-refillable valve of claim 21, wherein, the check ball has a measure of hardness within a 60–80 durometer reading range.

26. A container comprising:

a vessel having a wall and defining a container opening in the wall;

a valve housing defining a valve chamber mounted in the container opening, with the valve chamber having a proximal end and a distal end;

a valve core including a valve pin coupled to the valve housing in the valve chamber;

a detent formed in the valve housing and extending into the valve chamber; and a check ball positioned in the valve chamber with the check ball configured to move from a first position past the detent to a second position, wherein the check ball is disposed against a ball seat at the distal end of the valve chamber forming a seal that prevents refilling of the container.

27. The container of claim 26, wherein the detent that is arcuate and segmented.

28. The container of claim 26, wherein the detent is configured as at least two dimples formed in the valve housing and extending into the valve chamber.

29. The container of claim 26, wherein, the check ball is composed of an elastomeric material.

30. The container of claim 26, wherein, the check ball has a measure of hardness within a 60–80 durometer reading range.

* * * * *